United States Patent
Weber et al.

[11] Patent Number: 6,105,555
[45] Date of Patent: Aug. 22, 2000

[54] TURBOCHARGED INTERNAL COMBUSTION ENGINE WITH SYSTEM AND METHOD FOR ENHANCING TURBOCHARGER POWER

[75] Inventors: Harold G. Weber; Bruce A. Watson, both of Columbus, Ind.

[73] Assignee: Cummins Engine Company, Inc., Columbus, Ind.

[21] Appl. No.: 09/283,292

[22] Filed: Apr. 1, 1999

[51] Int. Cl.$^7$ .............................. F02M 57/04; F01L 13/00
[52] U.S. Cl. ........................................ 123/493; 123/90.15
[58] Field of Search .................................. 123/493, 492, 123/480, 568.11, 559.1, 559.2, 90.15, 90.16; 60/605.1, 605.2

[56] References Cited

U.S. PATENT DOCUMENTS

| | | |
|---|---|---|
| 1,895,538 | 1/1933 | Buchi . |
| 2,793,631 | 5/1957 | Schilling ................................... 123/59 |
| 4,656,834 | 4/1987 | Elpern ....................................... 60/602 |
| 4,733,535 | 3/1988 | Olofsson ................................ 60/605.1 |
| 5,271,229 | 12/1993 | Clarke et al. ........................... 60/605.1 |
| 5,417,068 | 5/1995 | Olofsson ................................ 60/605.1 |
| 5,443,050 | 8/1995 | Hitomi et al. ........................... 123/492 |
| 5,937,807 | 8/1999 | Peters et al. ......................... 123/90.15 |

FOREIGN PATENT DOCUMENTS

| | | |
|---|---|---|
| 5-262671 | 10/1993 | Japan . |
| 6-146909 | 5/1994 | Japan . |
| 10-227226 | 8/1998 | Japan . |
| WO 98/07973 | 2/1998 | WIPO . |

OTHER PUBLICATIONS

Gennady V. Ivanov and Frederick Tepper, "Activated Aluminum as a Stored Energy Source for Propellants", Presented at the Fourth International Symposium, Stockholm, Sweden, May 27–28, 1996.

Primary Examiner—Henry C. Yuen
Assistant Examiner—Hieu T. Vo
Attorney, Agent, or Firm—Nixon Peabody LLP; Charles M. Leedom, Jr.

[57] ABSTRACT

An improved turbocharged internal combustion engine is provided having a system and method for preventing a rapid decrease of turbocharger power during rapid fuel reduction transients in engine operation due to reductions in fuel flow rate to the engine. The engine includes a turbocharger power enhancing system including an exhaust valve control device capable of varying the timing of opening of the engine exhaust valves. The turbocharger power enhancing system also includes a processor which generates a control signal when a reduction in the fuel delivery rate is detected. The control signal operates the exhaust valve control device to advance the timing of opening of the exhaust valves to cause additional exhaust gas to be delivered to the turbine thereby preventing a rapid decrease of compressor speed and preventing compressor surge. The system and method may require the presence of one or more other engine operating conditions before the exhaust valve timing may be advanced, such as a minimum intake pressure, a minimum reduction in the fuel rate, a fuel rate reduction within a specific time period and/or an engine speed below a predetermined value.

24 Claims, 3 Drawing Sheets

TURBOCHARGED INTERNAL COMBUSTION ENGINE WITH SYSTEM AND METHOD FOR ENHANCING TURBOCHARGER POWER

TECHNICAL FIELD

The present invention relates to a system and method for an internal combustion engine having a turbocharger. More specifically, the present inventions relates to a system for reducing turbocharger power loss and compressor system surge when the engine fueling is rapidly reduced.

BACKGROUND OF THE INVENTION

Internal combustion engine systems including at least one turbocharger have long been used to increase the power and efficiency of the engine. The turbocharger includes a turbine operated by exhaust gas and a compressor operatively connected to the turbine for compressing intake air. Turbocharged engines rely upon the power from the turbocharger turbine to supply energy to the compressor. The compressor is typically connected to the turbine by a shaft and supplies energy to the engine charge air. During operation, exhaust gas flows from engine cylinders through exhaust valves to the turbine. The exhaust gas drives the turbine thereby causing the compressor to increase the flow of charge air into an engine cylinder thus permitting an increase in engine power output. An aftercooler may be provided between the compressor output and engine to further increase the quantity of charge air delivered to the engine cylinder.

If the engine is running at or near full throttle conditions, the turbine supplies considerable energy to the compressor. If, under these conditions, the fueling is suddenly reduced, the turbine inlet temperature decreases resulting in a decrease in power from the turbine. Consequently, the compressor receives less power from the turbine and begins to reduce speed. The pressure increase that the compressor is capable of delivering to the charge air depends substantially on the compressor speed and slightly on the flow rate of charge air through the compressor. As a practical matter during operation, the turbocharger speed decreases when the fuel is shut off. If the turbocharger speed decreases too rapidly, or the intake manifold pressure cannot decrease fast enough, the compressor may begin to undesirably experience "surge". If an aftercooler is provided, the aftercooler and associated piping volume contains a considerable amount of air which must be ingested by the engine before the pressure in the intake system can decrease. Therefore, the intake manifold pressure may not decrease at a sufficient rate due to the inability of the aftercooler volume to empty through the engine fast enough.

When the compressor begins to experience surge, the flow through the compressor alternates direction and magnitude rapidly, disadvantageously resulting in the generation of objectionable noise. The alternating flows also cause alternating axial forces on the turbocharger bearings possibly resulting in excessive bearing wear and damage.

Japanese patent application 5263671 discloses a valve timing control device for an internal combustion engine equipped with a turbocharger. The exhaust valves are controlled so that one valve opens during the exhaust stroke in advance of the opening of the remaining exhaust valve associated with the same cylinder. However, this reference does not appear to suggest opening an exhaust valve early so as to address the problem of surge.

International publication number WO 98/07973 discloses a turbocharged premixed charge compression ignition engine including exhaust valves. However, this reference fails to suggest any advantages of varying exhaust valve opening.

Consequently, there is a need for system and method for effectively enhancing turbocharger power and preventing compressor system surge during a decrease in fuel rate delivery to the engine.

SUMMARY OF THE INVENTION

It is an object of the present invention, therefore, to overcome the disadvantages of the prior art and to provide a turbocharged internal combustion engine capable of providing less rapid decreases in turbocharger power when fuel rate delivery is decreased.

Another object of the present invention is to provide a turbocharged internal combustion engine which prevents turbocharger compressor speed from falling so rapidly during a decrease in engine fueling.

Yet another object of the present invention is to provide a turbocharged internal combustion engine for preventing the turbocharger compressor from surging during operation.

A further object of the present invention is to provide a turbocharged internal combustion engine capable of automatically diverting cylinder gas to the turbocharger turbine earlier than normal during a given cycle based on predetermined engine operating conditions.

A still further object of the present invention is to provide a turbocharged internal combustion engine which minimizes turbocharger noise during transients.

Still another object of the present invention is to provide a turbocharged internal combustion engine which minimizes undesirable forces on the turbocharger bearings during operation.

A further object of the present invention is to provide a method for preventing a rapid fall off in turbocharger power during rapid fuel reduction transients of operation in an internal combustion engine by advancing exhaust valve opening.

Still another object of the present invention is to provide a method for preventing a rapid fall off in turbocharger power during rapid fuel reduction transients by advancing the timing of the opening of the exhaust valve only when the fuel rate reduction occurs over a time period less than a predetermined maximum time period.

Yet another object of the present invention is to provide a method for preventing a rapid decrease of turbocharger power during rapid fuel reduction transients in an engine only upon the detection of at least two engine operating conditions.

These and other objects of the present invention are achieved by providing an internal combustion engine comprising an engine body, a combustion chamber formed in the engine body, an intake system for delivering charge air to the combustion chamber and an exhaust gas system positioned to direct exhaust gas from the combustion chamber. The exhaust gas system includes an exhaust port formed in the engine body and an exhaust valve mounted to open and close the exhaust port. The engine further includes a turbocharger including a turbine mounted in the exhaust gas system downstream of the exhaust port and a compressor operatively connected to the turbine and mounted in the intake air system. The engine also includes a turbocharger power enhancing system operatively connected to the exhaust valve which includes a fuel rate reduction means for determining a reduction in the rate of fuel delivery to the engine.

The turbocharger power enhancing system includes an exhaust valve control device adapted to vary the timing of opening of the exhaust valve in response to the reduction in the fuel rate. The turbocharger power enhancing system may further include a processor electrically connected to the engine wherein the processor is adapted to transmit a control signal based on the fuel rate reduction causing advancement of the timing of opening of the exhaust valve only when the fuel rate reduction is greater than a predetermined percentage of a maximum fuel rate value at a predetermined engine speed. Further, the predetermined percentage of a maximum fuel rate value may be approximately 20%. In addition, the processor may be adapted to transmit the control signal only when the fuel rate reduction occurs over a time period less than a predetermined maximum time period. The maximum time period may be approximately one second.

The intake pressure sensor may be adapted to sense one of the pressure in the intake air system between the compressor and the combustion chamber and an engine parameter related to the pressure in the intake air system between the compressor and the combustion chamber. The intake pressure sensor may be adapted to transmit an intake pressure signal in response to detecting the pressure in the intake air system. The processor may be electrically connected to the intake pressure sensor and adapted to receive the intake pressure signal and transmit a control signal only when the intake air pressure is greater than a predetermined minimum value to cause advancement of the timing of opening of the exhaust valve. An engine speed sensor may further be included and adapted to detect engine speed and transmit a speed signal. The processor may be electrically connected to the speed sensor and adapted to receive the speed signal and generate a control signal only when the engine speed is less than a predetermined engine speed value to cause advancement of the timing of opening of the exhaust valve.

The present invention is also directed to a method for preventing a rapid decrease of turbocharger power during rapid fuel reduction transients of operation in an internal combustion engine having a combustion chamber, an intake air system for delivering charge air to the combustion chamber, an exhaust gas system positioned to direct exhaust gas from the combustion chamber and including an exhaust port and an exhaust valve mounted to open and close the exhaust port, and a turbocharger, wherein the method comprises the steps of detecting a reduction in a rate of fuel delivery to the combustion chamber and advancing a timing of opening of the exhaust valve by a predetermined number of crank angle degrees in response to the control signal to cause exhaust gas flow sufficient to prevent a rapid decrease of, therefore enhance, turbocharger power. The method may further include the step of generating a control signal based on the fuel rate reduction. The control signal may be generated for advancing the timing of opening of the exhaust valve only when the fuel rate reduction is greater than a predetermined percentage of a maximum fuel rate value at a predetermined engine speed. Moreover, the percentage of a maximum fuel rate value may be approximately 20%. Also, the advancing of the timing of the opening of the exhaust valve may occur only when the fuel rate reduction occurs over a time period less than a predetermined maximum time period. The method may also include other features as detailed hereinbelow.

DETAILED DESCRIPTION OF THE PREFERRED EMBODIMENT

Figure 1:
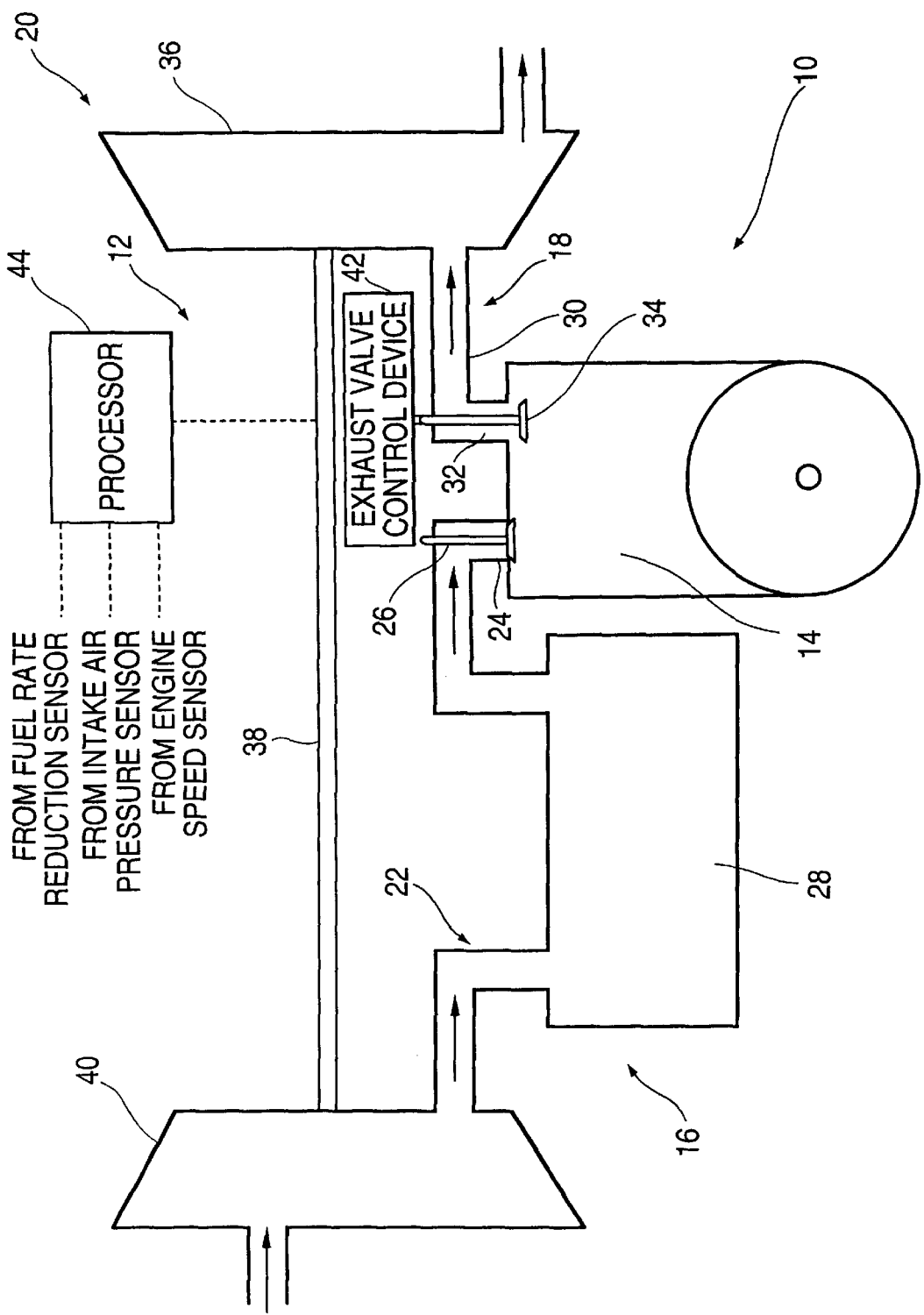
FIG. 1 is a diagrammatic view of the turbocharged internal combustion engine of the present invention.

Referring to FIG. 1, there is shown the internal combustion engine 10 of the present invention including the turbocharger power enhancing system, indicated generally at 12, for effectively preventing rapid loss of turbocharger power, and therefore compression system surge, in response to a reduction in the engine fuel delivery rate. Internal combustion engine 10 generally includes a combustion chamber 14 in which a combustion process occurs, an intake air system 16 for delivering intake air to combustion chamber 14, an exhaust gas system 18 positioned to direct exhaust gas from combustion chamber 14 and a turbocharger 20 for increasing engine power output. As discussed in detail hereinbelow, turbocharger power enhancing system 12 effectively enhances turbocharger power throughout rapid fuel reduction transients, i.e. fuel rate reduction periods, by enhancing turbocharger shaft speed, i.e. preventing rapid reductions in turbocharger shaft speed, thereby preventing the compression system of turbocharger 20 from surge operation.

FIG. 1 illustrates only a single combustion chamber 14 for a reciprocating piston type of engine 10. However, the turbocharger power enhancing system 12 of the present invention may be used in any type of internal combustion engine, such as a rotary engine, having a turbocharger. In addition, the present invention may be applied to any turbocharged engine having any number of combustion chambers, i.e. two, four, six, eight, ten or twelve, wherein at least one of the combustion chambers are served by one or more turbochargers.

Intake air system 16 includes an intake air passage 22 for delivering intake or charge air to combustion chamber 14 and an intake port 24 connecting intake air passage 22 to combustion chamber 14. Intake air system 16 also includes an intake valve 26 reciprocally mounted to open and close intake port 24 in timed relationship to an angular position of rotation of engine 10. That is, engine 10 operates to create cycles of successive compression and expansion periods in which charge air in combustion chamber 14 is compressed and then permitted to expand to provide the driving force to the engine output. Intake valve 26 is controlled in timed relationship to these compression and expansion periods to achieve the desired intake effect in a conventional manner. Intake air system 16 may also include an aftercooler 28 positioned along intake air passage 22 for cooling the intake air to thereby increase the quantity of intake air delivered to combustion chamber 14. Aftercooler 28 may be the air-to-air type cooler typically mounted at the front end of a vehicle for permitting cooling of the intake air by ambient air. Alternatively, aftercooler 28 may use a cooling fluid, such as engine coolant, to cool the intake air.

Exhaust gas system 18 includes an exhaust gas passage 30 for directing exhaust gas from combustion chamber 14 and an exhaust port 32 connecting exhaust gas passage 30 to combustion chamber 14. Exhaust gas system 18 further includes at least one exhaust valve 34 reciprocally mounted to open and close exhaust port 32 in timed relation to the angular position of engine rotation. Although intake valve 26 and exhaust valve 34 are shown as reciprocally mounted valves, valves 26, 34 may be any other type of valve capable of effectively opening and closing the respective ports, such as a rotary valve.

As shown in FIG. 1, turbocharger 20 includes a turbine 36 positioned along exhaust gas passage 30 for receiving exhaust gas and transferring the energy of the exhaust gas into rotation of a turbocharger shaft 38. Turbocharger 20 also includes a compressor 40 connected to an opposite end of shaft 38 and positioned along intake air passage 22. Rotation of shaft 38 causes compressor 40 to rotate resulting in an increase in the flow of intake air into combustion chamber 14 thus permitting an increase in engine power output. Turbocharger 20 may be any conventional turbocharger capable of being driven by exhaust gas flowing from one or more combustion chambers of an engine.

Figure 2:
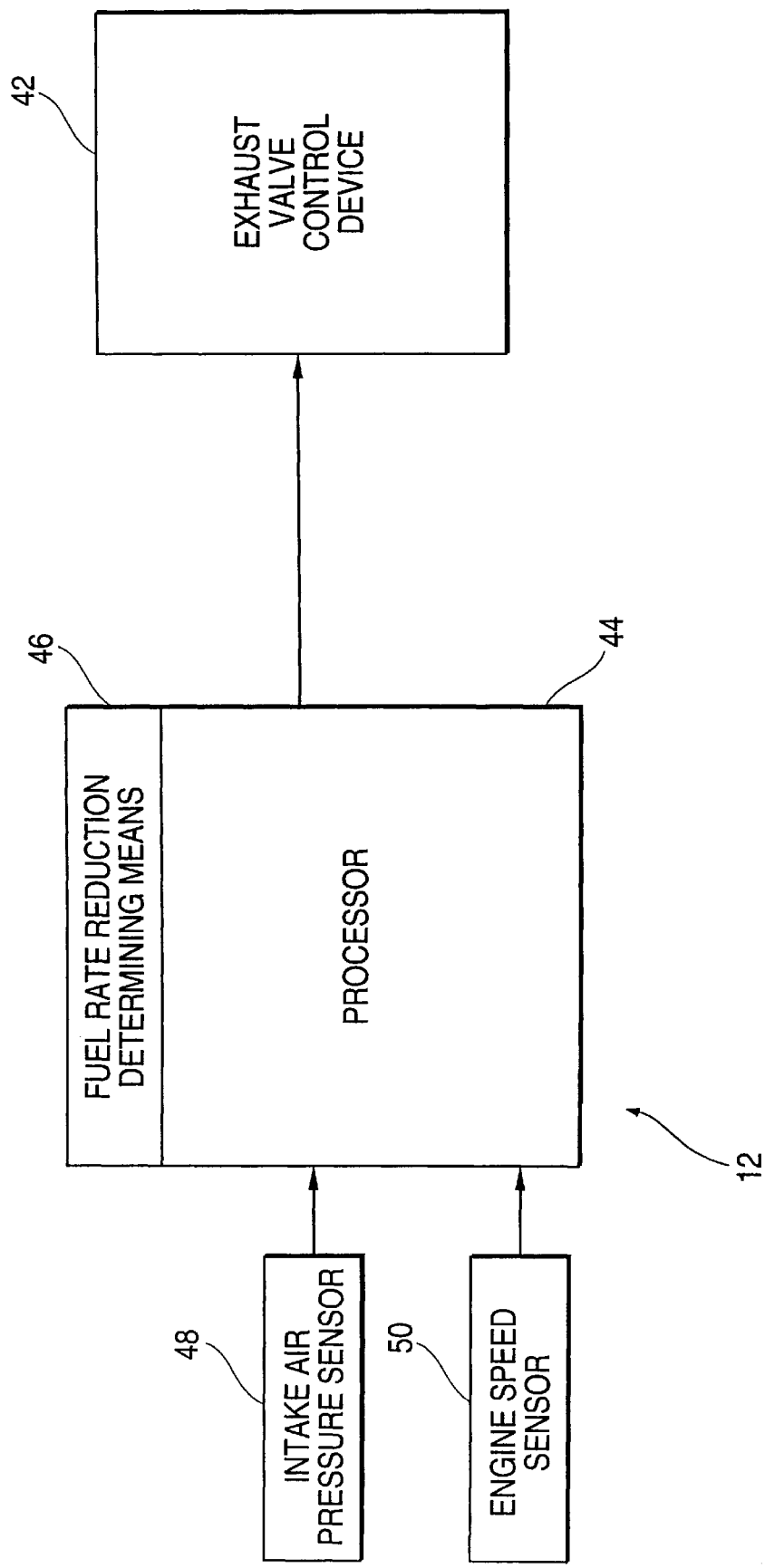
FIG. 2 is a control diagram showing the sensors, processor and exhaust valve control device of the present invention.

Referring to FIGS. 1 and 2, the turbocharger power enhancing system 12 includes an exhaust valve control device 42 for varying a timing of opening of the exhaust valve 34 relative to an angle of rotation of the engine. That is, exhaust valve control device 42 is capable of advancing and retarding the opening of exhaust valve 34 during successive compression and expansion periods associated with a conventional reciprocating piston type engine. Exhaust valve control device 42 may be any conventional device capable of effectively varying the timing of opening of exhaust valve 34, such as the system disclosed in U.S. Pat. No. 5,626,116, the entire contents of which is hereby incorporated by reference. Of course, any other exhaust valve timing control mechanism capable of selectively and controllably varying the timing of opening of exhaust valve 34 may be used. Turbocharger power enhancing system 12 further includes a control unit or processor 44 electrically connected to exhaust valve control device 42 for transmitting a control signal to device 42 for varying the timing of opening of exhaust valve 34. Turbocharger power enhancing system 12 also includes a fuel rate reduction determining means 46 capable of determining a reduction in the rate of fuel delivery to combustion chamber 14. Fuel rate reduction determining means 46 may be a processor formed as an integral part or component of processor 44 as shown in FIG. 2, or as a separate component. Also, processor 44 may be implemented in an existing processor or control unit associated with the engine for controlling the engine functions. In either case, in the preferred embodiment, fuel rate reduction determining system 46 samples existing fuel demand values to determine the fuel rate reduction. For example, when an engine operator or governor requests a fueling change, the fueling change information or signal is sent electrically to the engine processor or controller. The engine processor then typically analyzes one or more other engine parameters and generates one or more fueling control signals which are transmitted to the fuel delivery mechanism, i.e. fuel injectors. Thus, the fuel rate reduction system 46 may sample these control signals to determine the rate of change in fuel flow.

Processor 44 is adapted to transmit the control signal based on the fuel rate reduction information. Specifically, in the preferred embodiment, the control signal will only be generated when the fuel rate reduction is greater than a predetermined percentage of a maximum fuel rate value at the current engine speed. Moreover, it is preferred that the fuel rate reduction occur over a time period less than a predetermined maximum time period. For example, in a preferred embodiment, processor 44 may be designed to transmit a control signal only when the fuel rate reduction is greater than 20% of the maximum fuel rate value at the current engine speed over a time period of less than approximately one second. If the engine fuel rate reduction drops over a period greater than approximately one second, then compressor surge will not likely occur. That is, compressor surge due to engine fuel rate reduction does not occur unless the fuel rate is quickly reduced over a short time period. If the time period for fuel rate reduction is greater than approximately one second, it is highly likely that the turbocharger compressor 40 will not be driven into the surge area, as discussed more fully hereinbelow, since the engine will consume the pressurized air in the aftercooler and inlet passage piping thereby avoiding the undesirable back flow of intake air toward the compressor.

In the preferred embodiment, even in the presence of a fuel rate reduction of greater than 20%, it is also desirable to limit the advancing of the exhaust valve timing until the intake manifold pressure becomes greater than a predetermined minimum pressure. For example, Applicants have found that compressor surge is not typically a problem in some engines until the intake manifold pressure becomes greater than approximately two atmospheres. Since compressor surge is primarily caused by excessive back pressure on the compressor, that is, the pressure in the downstream intake passage, including the aftercooler, being greater than the pressure the compressor can deliver at its current speed, a minimal intake manifold pressure will typically not create the undesirable compressor surge. Engine 10 includes an intake manifold pressure sensor 48 for detecting the pressure in intake passage 22 anywhere between compressor 40 and intake port 24 and generating an intake pressure signal. Sensor 48 may be designed to generate and transmit a pressure signal to processor 44 only when the intake pressure is greater than the predetermined minimum pressure. Although in a preferred embodiment the intake manifold pressure is measured by sensor 48, other engine parameters having a correlation to intake manifold pressure may be suitable. For example, turbocharger shaft speed or even exhaust system pressure can be related to intake manifold pressure and therefore may be chosen in alternative embodiments.

The preferred embodiment of the present invention also includes an engine speed input to processor 44 which permits the engine to be operated in an advanced exhaust valve timing mode only when the engine speed is below a predetermined value. The engine 10 is provided with an engine speed sensor 50 for detecting engine speed and transmitting a speed signal. Processor 44 receives the engine speed signal and generates a control signal only when the engine speed is less than the predetermined engine speed value to cause advancement of the timing of opening of exhaust valve 34. If the engine is at the high end of its operating range, the operating point in the compressor map illustrated in FIG. 3 will be far to the right in the illustrated map, and thus the initial operating point before the engine throttle is shut will be far from a surge line dividing non-surge and surge areas of operation. Thus, at high engine speeds, the compressor may not enter the surge area to the left of the surge line when the throttle is closed suddenly. Therefore, the need to open the exhaust valve 34 earlier is minimal or does not exist.

In operation, the processor 44 continuously monitors both the signals from intake manifold sensor 48 and engine speed sensor 50, and the fuel rate reduction via fuel rate reduction determining means 46. When all signals are present, processor 44 would then send a control signal to exhaust valve control device 42 causing exhaust valve 34 to open earlier than normal during the compression or expansion period in combustion chamber 14. Applicants have found that the time period during which the exhaust valves are operating in an early opening or advanced mode need only be extremely limited to prevent a rapid decrease of turbocharger shaft speed during a rapid fuel reduction transient associated with the engine fuel rate reduction. Specifically, applicants have found that exhaust valve control device 42 need only operate exhaust valve 34 in an advanced mode for a time period in the range of approximately 0.5–1 second, before returning to a normal timing mode, to achieve the benefit of providing the turbine with additional energy and, in turn, preventing the compressor from being driven into surge operation. Clearly, exhaust valve 34 should be opened for a sufficient period of time necessary to prevent compressor surge. Although some degree of turbocharger speed and power reduction will occur, turbocharger power enhancing system is designed to substantially maintain turbocharger power and speed at a sufficient level necessary to prevent surge.

Thus, processor 44 would sense the presence of each of the signals and the fuel rate reduction, and only upon sensing the presence of both the intake and speed signals, and determining the necessary fuel rate reduction, forward the control signal to exhaust valve control device 42 for operating the exhaust valve 34 in an early opening or advanced mode. In this design, processor 44 may simply be a logic controller. Alternatively, the sensors 48 and 50 may be designed to continuously transmit a signal to processor 44 regardless of the value of the sensed condition, i.e. intake manifold pressure and engine speed, and the processor 44 designed to process the signals and determine whether the conditions described hereinabove exist. If the conditions do exist, processor 44 will then of course generate and transmit the control signal to the exhaust valve control device 42 for advancing the timing of opening of the exhaust valve.

Processor 44 may also be adapted to variably control the length of time the exhaust valve is open and/or the degree of advancement of the timing of opening from one advanced opening event to the next event. There are at least two reasons for variably controlling the crank angle at which the exhaust valve opens depending upon engine operating conditions. First, the degree of severity of compressor surge tends to be approximately proportional to the pressure of the charge air in the intake manifold. The pressure will be generally be higher as the engine power and/or speed increases. The required exhaust valve opening point may be adjusted so as to provide the additional turbine energy as the intake manifold pressure increases. Secondly, as the intake manifold pressure and engine fueling rates increase, the cylinder gas pressure at any given crank angle will increase, and the stresses on the valve opening mechanism will increase. The required exhaust valve opening point may be adjusted to a crank angle where the cylinder gas pressures are not so high as to cause excessive stresses on the valve opening mechanism. The determination of the degree of variable control based on engine operating conditions is best implemented using software contained in processor 44. Therefore, as engine operation conditions change, the degree of advancement of the timing of opening and/or the length of time the exhaust valve is open, may be varied from one advanced opening event to the next.

Figure 3:
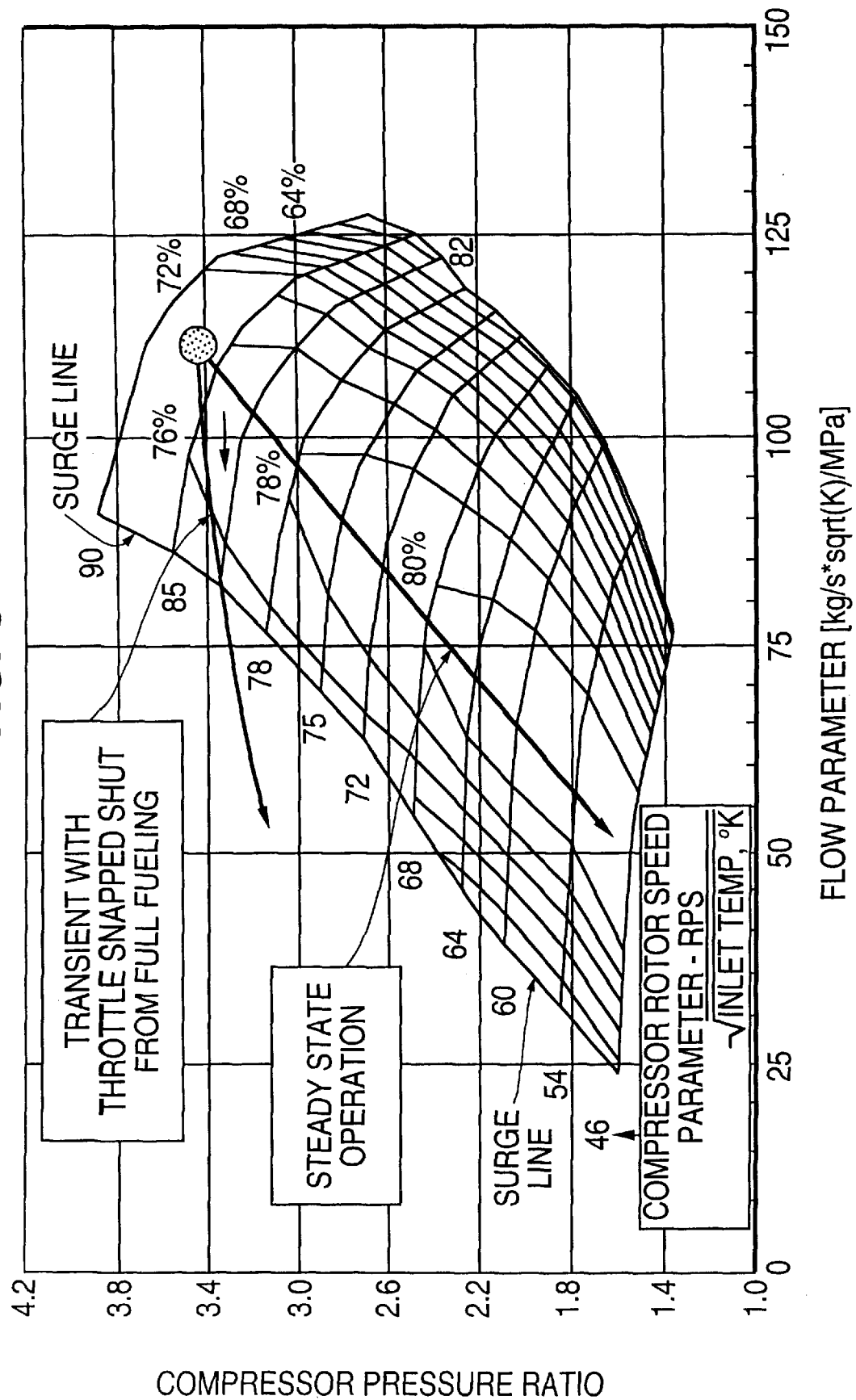
FIG. 3 is a graph showing operation of a conventional engine at steady state condition and during a decrease in fueling rate with movement into the surge area of operation.

The present internal combustion engine 10 including turbocharger power enhancing system 12 effectively overcomes the disadvantages of existing turbocharged engines by limiting or reducing a decrease in turbocharger shaft speed during transient reductions in engine fueling thereby avoiding compressor surge operation. The compressor of a turbocharger in a conventional internal combustion engine experiences surge when the engine is running at or near full throttle conditions and fueling is suddenly reduced. As a result, the turbine inlet temperature decreases resulting in a decrease in power from the turbine. Consequently, the turbine and therefore the compressor begin to reduce speed. If the turbocharger speed decreases too rapidly, or the intake manifold pressure cannot decrease fast enough, the compressor may begin to experience surge operation. Compressor surge is caused by the pressure in the piping and components downstream of the compressor being higher than the compressor can deliver at its current operating speed. As a result of this undesirable pressure differential, intake air from the aftercooler and intake manifold may actually begin to flow in a reverse path toward the compressor or cause a back pressure on the compressor. The likelihood of experiencing compressor surge in engines mounted in vehicles has increased over the years as air-to-air aftercoolers are being used to provide more effective cooling. As compressor pressure ratios increased over the years to obtain more power out of the engine, the temperature of the charge air downstream of the compressor increased to an undesirable level. The air-to-air aftercooler simply more effectively lowers the temperature of the intake air than other existing aftercoolers, especially given packaging considerations. Also in engines previously not requiring an aftercooler, the increased compressor pressure ratios required after cooling of the air to create an effective process. As a result, the volume of the piping downstream of the compressor is increased when an aftercooler is added to the system, or an air-to-air aftercooler is used instead of another form of cooler due to the location and design of the air-to-air aftercooler, especially in a vehicle. Consequently, a considerable amount of pressurized air between the compressor and the intake port must be ingested by the engine after a reduction in fueling before the pressure in the intake system can decrease to prevent a back pressure on the compressor. Therefore, the pressure in the intake passages, i.e. aftercooler and intake manifold, may not decrease at a sufficient rate due to the inability of the aftercooler volume to empty through the engine fast enough to prevent compressor surge. When the compressor begins to experience surge, the flow through the compressor alternates direction and magnitude rapidly, disadvantageously resulting in the generation of objectionable noise. The alternating flows also cause alternating axial forces on the turbocharger bearings possibly resulting in excessive bearing wear and damage. FIG. 3 illustrates a surge line, to the left of which exists a surge area in which compressor surge occurs. In the example shown in FIG. 3, when operating at full fueling, the compressor will likely experience surge as the throttle is snapped shut and operation enters the surge area to the left of the surge line. Turbocharger power enhancing system 12 of the present invention effectively limits undesirable decreases in turbocharger speed by supplying higher energy exhaust gas to turbine 36 during reductions in engine fueling. Specifically, turbocharger power enhancing system 12 enhances compressor power during rapid fuel reduction transients so as to maintain the pressure of the intake air at and immediately downstream of compressor 40 thereby preventing the back pressure and avoiding compressor surge. Applicants have found that the timing of opening of the exhaust valve earlier in the cycle is in the range of 30–80 crank angle degrees earlier than the angle used for conventional operation with the engine delivering power. At 80 crank angle degrees, the cylinder pressure may be too high to practically open poppet-type exhaust valves. However, other valves, such as rotary valves, may be used which can be moved in high pressure environments. Generally, exhaust valves open about 120 crank angle degrees after the top dead center position of a piston in a reciprocating piston type internal combustion engine.

INDUSTRIAL APPLICABILITY

The present turbocharged internal combustion engine may be used in any vehicle or industrial application in which effective prevention of compressor surge is desired.

We claim:

1. An internal combustion engine, comprising:
    an engine body;
    a combustion chamber formed in said engine body;
    an intake air system for delivering charge air to said combustion chamber;
    an exhaust gas system positioned to direct exhaust gas from said combustion chamber, said exhaust gas system including an exhaust port formed in said engine body and an exhaust valve mounted to open and close said exhaust port;
    a turbocharger including a turbine mounted in said exhaust gas system downstream of said exhaust port and a compressor operatively connected to said turbine and mounted in said intake air system; and
    a turbocharger power enhancing system operatively connected to said exhaust valve, said turbocharger power enhancing system including a fuel rate reduction determining means for determining a reduction in a rate of fuel delivery to said combustion chamber and an exhaust valve control device adapted to vary a timing of opening of said exhaust valve in response to said reduction in the rate of fuel delivery to said combustion chamber.

2. The engine of claim 1, wherein said turbocharger power enhancing system further includes a processor electrically connected to the engine for controlling fuel delivery to said combustion chamber, said processor being adapted to transmit a control signal based on said reduction in the rate of fuel delivery to the combustion chamber causing advancement of the timing of opening of said exhaust valve only when the fuel rate reduction is greater than a predetermined percentage of a maximum fuel rate value at a predetermined engine speed.

3. The engine of claim 2, wherein said predetermined percentage of a maximum fuel rate value is approximately 20%.

4. The engine of claim 2, wherein said processor is adapted to transmit the control signal only when the fuel rate reduction occurs over a time period less than a predetermined maximum time period.

5. The engine of claim 4, wherein said predetermined percentage of the maximum fuel rate is approximately 20% and said predetermined maximum time period is approximately one second.

6. The engine of claim 1, further including an intake pressure sensor adapted to sense one of the pressure in said intake air system between said compressor and said combustion chamber and an engine parameter related to the pressure in said intake air system between said compressor and said combustion chamber, said intake pressure sensor adapted to transmit an intake pressure signal in response to detecting the pressure in said intake air system, further including a processor electrically connected to said intake pressure sensor and adapted to transmit a control signal only when the intake air pressure is greater than a predetermined minimum value to cause advancement of the timing of opening of said exhaust valve.

7. The engine of claim 1, further including an engine speed sensor adapted to detect engine speed and transmit a speed signal, further including a processor electrically connected to said speed sensor and adapted to generate a control signal only when the engine speed is less than a predetermined engine speed value to cause advancement of the timing of opening of said exhaust valve.

8. The engine of claim 1, wherein said turbocharger power enhancing system further includes a processor electrically connected to the engine and adapted to variably control one of a length of time said exhaust valve is open and the timing of opening of the exhaust valve.

9. An internal combustion engine, comprising:
    an engine body;
    a combustion chamber formed in said engine body;
    an intake air system for delivering charge air to said combustion chamber;
    an exhaust gas system positioned to direct exhaust gas from said combustion chamber, said exhaust gas system including an exhaust port formed in said engine body and an exhaust valve mounted to open and close said exhaust port;
    a turbocharger including a turbine mounted in said exhaust gas system downstream of said exhaust port and a compressor operatively connected to said turbine and mounted in said intake air system; and
    a turbocharger power enhancing means operatively connected to said exhaust valve for advancing a timing of opening of said exhaust valve including a fuel rate reduction determining means for determining a reduction in a rate of fuel delivery to said combustion chamber, said turbocharger power enhancing means operable in response to said reduction in the rate of fuel delivery to said combustion chamber.

10. The engine of claim 9, wherein said turbocharger power enhancing means further includes a processing means electrically connected to the engine for transmitting a control signal based on said reduction in the rate of fuel delivery to the combustion chamber for advancing the timing of opening of said exhaust valve only when the fuel rate reduction is greater than a predetermined percentage of a maximum fuel rate value at a predetermined engine speed.

11. The engine of claim 10, wherein said predetermined percentage of a maximum fuel rate value is approximately 20%.

12. The engine of claim 10, wherein said processing means is adapted to transmit the control signal only when the fuel rate reduction occurs over a time period less than a predetermined maximum time period.

13. The engine of claim 12, wherein said predetermined percentage of the maximum fuel rate is approximately 20% and said predetermined maximum time period is approximately one second.

14. The engine of claim 9, further including an intake pressure sensing means for sensing one of the pressure in said intake air system between said compressor and said combustion chamber and an engine parameter related to the pressure in said intake air system between said compressor and said combustion chamber, and for transmitting an intake pressure signal in response to detecting the pressure in said intake air system, further including a processing means electrically connected to said intake pressure sensing means and adapted to receive said intake pressure signal and transmit a control signal only when the intake air pressure is greater than a predetermined minimum value to cause advancement of the timing of opening of said exhaust valve.

15. The engine of claim 9, further including an engine speed sensor adapted to detect engine speed and transmit a speed signal, further including a processing means electrically connected to said speed sensor and adapted to receive said speed signal and generate a control signal only when the engine speed is less than a predetermined engine speed value to cause advancement of the timing of opening of said exhaust valve.

16. A method for preventing a rapid decrease of turbocharger power during rapid fuel reduction transients of operation in an internal combustion engine having a combustion chamber, an intake air system for delivering charge air to said combustion chamber undergoing cycles of successive compression and expansion periods, an exhaust gas system positioned to direct exhaust gas from said combustion chamber and including an exhaust port and an exhaust valve mounted to open and close said exhaust port, and a turbocharger, the method comprising the steps of:

- detecting a reduction in a rate of fuel delivery to the combustion chamber;
- advancing a timing of opening of the exhaust valve, based on the detecting of the fuel rate reduction, to cause the timing of exhaust valve opening to occur earlier in at least one cycle of the cycles of successive compression and expansion periods to cause exhaust gas flow sufficient to prevent a rapid decrease of turbocharger power.

17. The method of claim 16, further including the step of generating a control signal based on said fuel rate reduction.

18. The method of claim 17, wherein the control signal is generated for advancing the timing of opening of the exhaust valve only when the fuel rate reduction is greater than a predetermined percentage of a maximum fuel rate value at a predetermined engine speed.

19. The method of claim 18, wherein said predetermined percentage of a maximum fuel rate value is approximately 20%.

20. The engine of claim 16, wherein advancing of the timing of the opening of the exhaust valve occurs only when the fuel rate reduction occurs over a time period less than a predetermined maximum time period.

21. The method of claim 20, wherein said predetermined percentage of the maximum fuel rate is approximately 20% and said time period is approximately one second.

22. The method of claim 16, wherein said turbocharger includes a turbine mounted in said exhaust gas system downstream of said exhaust port and a compressor operatively connected to said turbine and mounted in said intake air system, further including the steps of detecting the pressure in the intake air system between said compressor and said combustion chamber and an engine parameter related to the pressure in the intake air system between said compressor and said combustion chamber, generating an intake pressure signal based on the pressure in said intake air system, and generating the control signal only when the intake air pressure is greater than a predetermined minimum value to cause advancement of the timing of opening of said exhaust valve.

23. The method of claim 16, further including the steps of detecting engine speed and generating the control signal only when the engine speed is less than a predetermined engine speed value to cause advancement of the timing of opening of said exhaust valve.

24. The method of claim 16, further including the step of variably advancing the timing of opening of the exhaust valve.

* * * * *